United States Patent [19]

Qureshi et al.

[11] Patent Number: 4,989,888
[45] Date of Patent: Feb. 5, 1991

[54] COMBINATION CHILD RESTRAINT & STROLLER

[76] Inventors: Khurshid A. Qureshi, 1870 Whitewater Dr., Rochester Hills, Mich. 48063; Gregory E. Peterson, 190 Ogemaw, Pontiac, Mich. 48053

[21] Appl. No.: 288,018

[22] Filed: Dec. 21, 1988

Related U.S. Application Data

[63] Continuation-in-part of Ser. No. 86,027, Aug. 17, 1987, abandoned.

[51] Int. Cl.⁵ .............................................. B62B 7/12
[52] U.S. Cl. ...................................... 280/30; 280/643; 280/648; 297/250; 297/397
[58] Field of Search ................. 280/30, 37, 643, 648, 280/649, 642, 47.4, 650, 658; 297/250, 191, 397

[56] References Cited

U.S. PATENT DOCUMENTS

| | | | |
|---|---|---|---|
| 2,291,640 | 8/1942 | Lee | 280/643 |
| 2,508,905 | 5/1950 | Cohen | 280/644 |
| 2,625,407 | 1/1953 | Varner | 280/643 |
| 2,805,076 | 9/1957 | Thomas | 280/30 |
| 2,812,949 | 11/1957 | Munro | 280/643 |
| 2,990,190 | 6/1961 | Eriksen | 280/30 |
| 3,207,528 | 9/1965 | Hasche | 280/47.38 |
| 3,679,223 | 7/1972 | Sakal | 280/37 |
| 3,815,702 | 6/1974 | Paanangn | 180/69.1 |
| 4,105,242 | 8/1978 | Terbeek | 280/30 |
| 4,239,259 | 12/1980 | Martinez | 280/649 |
| 4,398,748 | 8/1983 | Duvignacq | 280/649 |
| 4,438,941 | 3/1984 | Guillaume | 280/47.4 |
| 4,440,443 | 4/1984 | Nordskog | 297/191 |
| 4,461,510 | 7/1984 | Cunningham et al. | 297/250 |
| 4,620,711 | 11/1986 | Dick | 280/30 |
| 4,643,445 | 2/1987 | Cabagnero | 280/644 |
| 4,647,054 | 3/1987 | Chong | 280/30 |
| 4,679,804 | 7/1987 | Johnson | 280/30 |
| 4,685,688 | 8/1987 | Edwards | 280/30 |
| 4,736,959 | 4/1988 | Van Steenburg | 280/643 |
| 4,762,331 | 8/1988 | Tucker | 280/30 |
| 4,834,403 | 5/1989 | Yanus et al. | 280/30 |

FOREIGN PATENT DOCUMENTS

| | | | |
|---|---|---|---|
| 2006095 | 12/1969 | France | |
| 2548983 | 1/1985 | France | 297/250 |

*Primary Examiner*—David M. Mitchell
*Attorney, Agent, or Firm*—Brooks & Kushman

[57] ABSTRACT

A combination child restraint-stroller is disclosed which can be converted from a passive restraint car seat to a stroller, while the apparatus is held by an user with a child seated therein. The apparatus includes a body having a child support surface and an internal cavity therebelow with a downwardly facing opening. A front and rear strut are pivotably attached to the body having a pair of front and rear wheels rotatably attached thereto. A locking mechanism is provided to alternatively lock the front and rear struts in either the retracted passive restraint position within the body internal cavity, or in the extended stroller position.

13 Claims, 6 Drawing Sheets

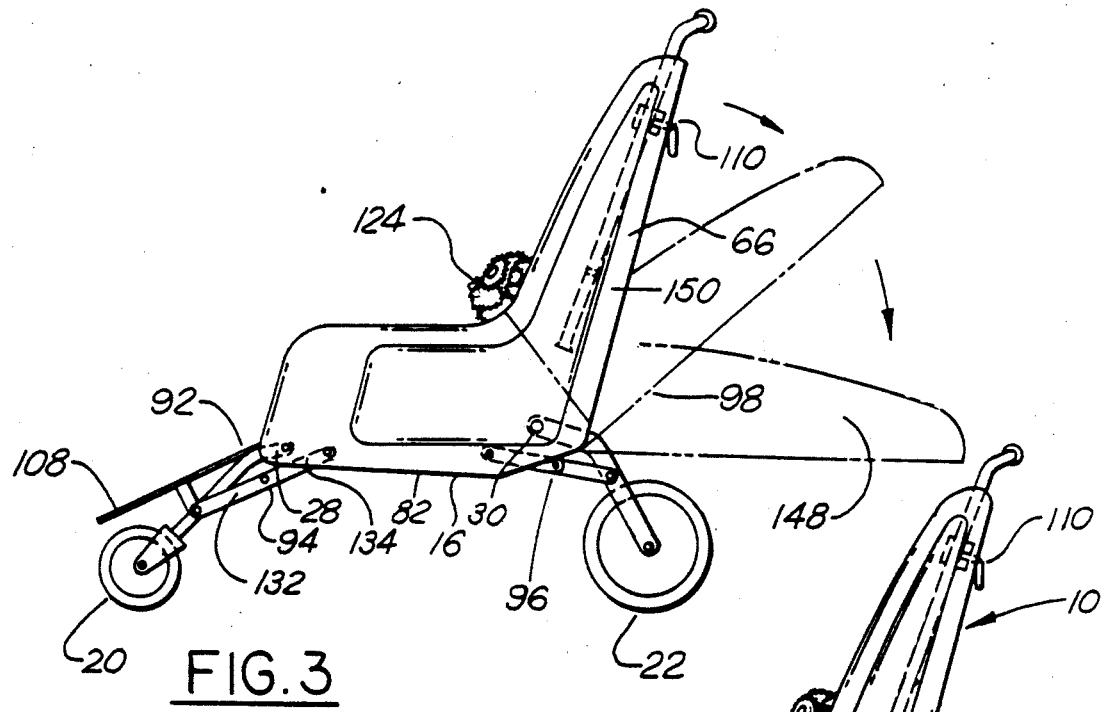
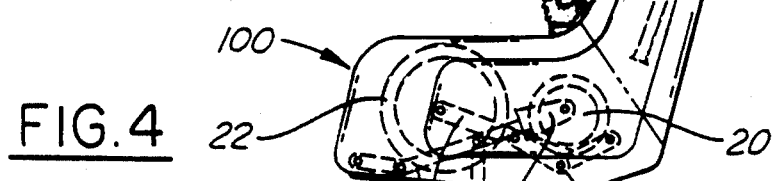
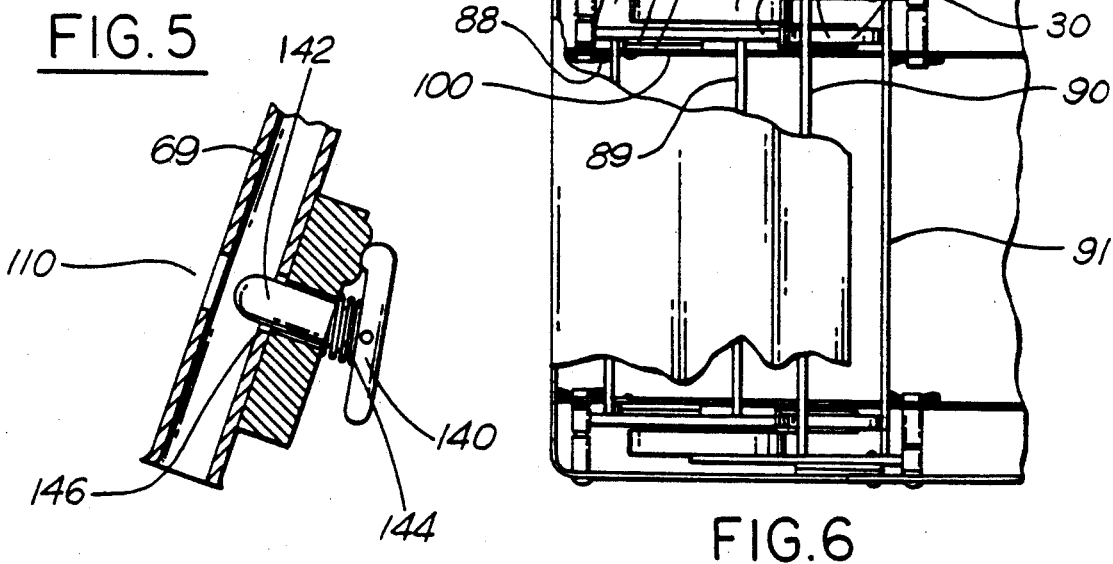

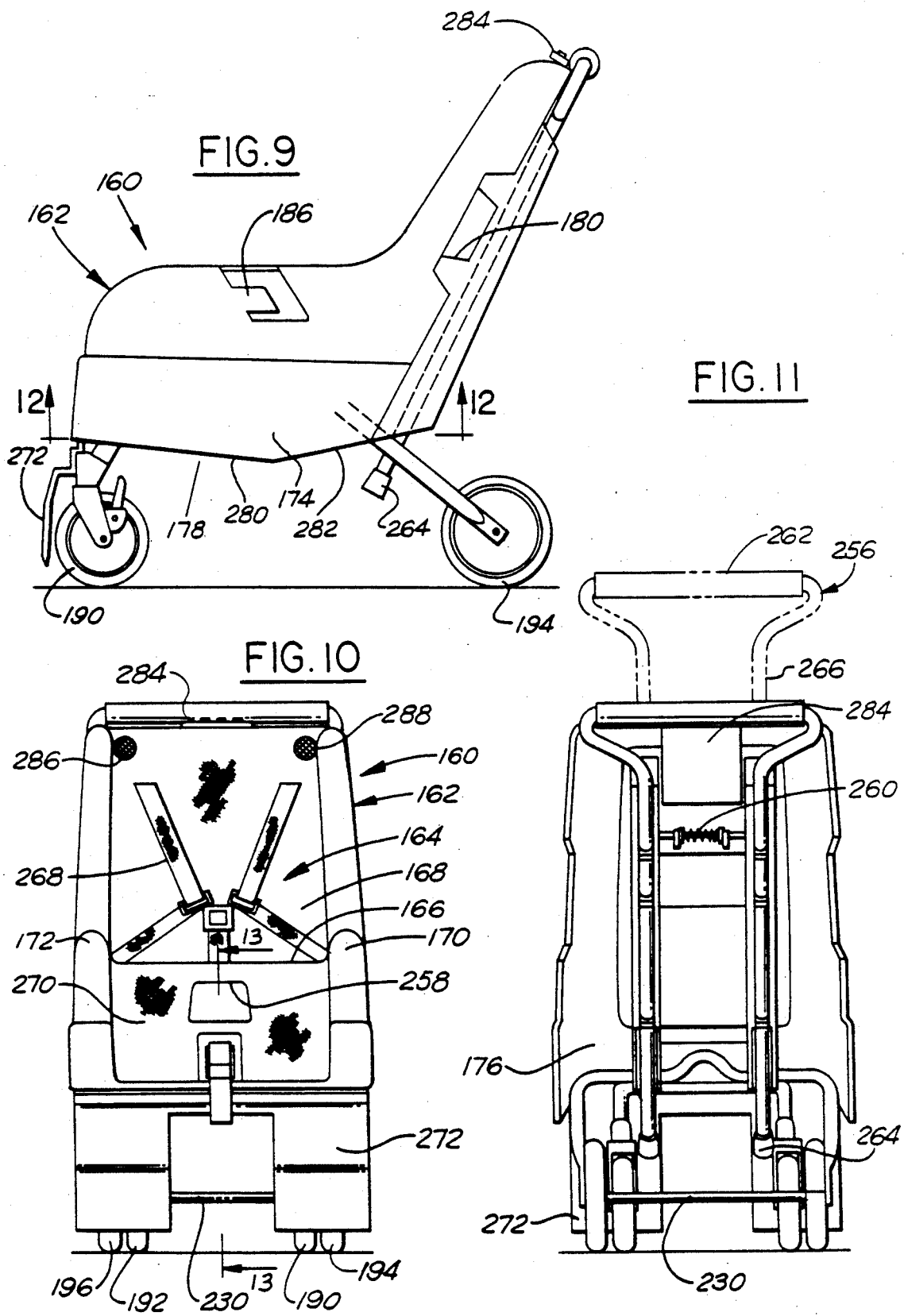

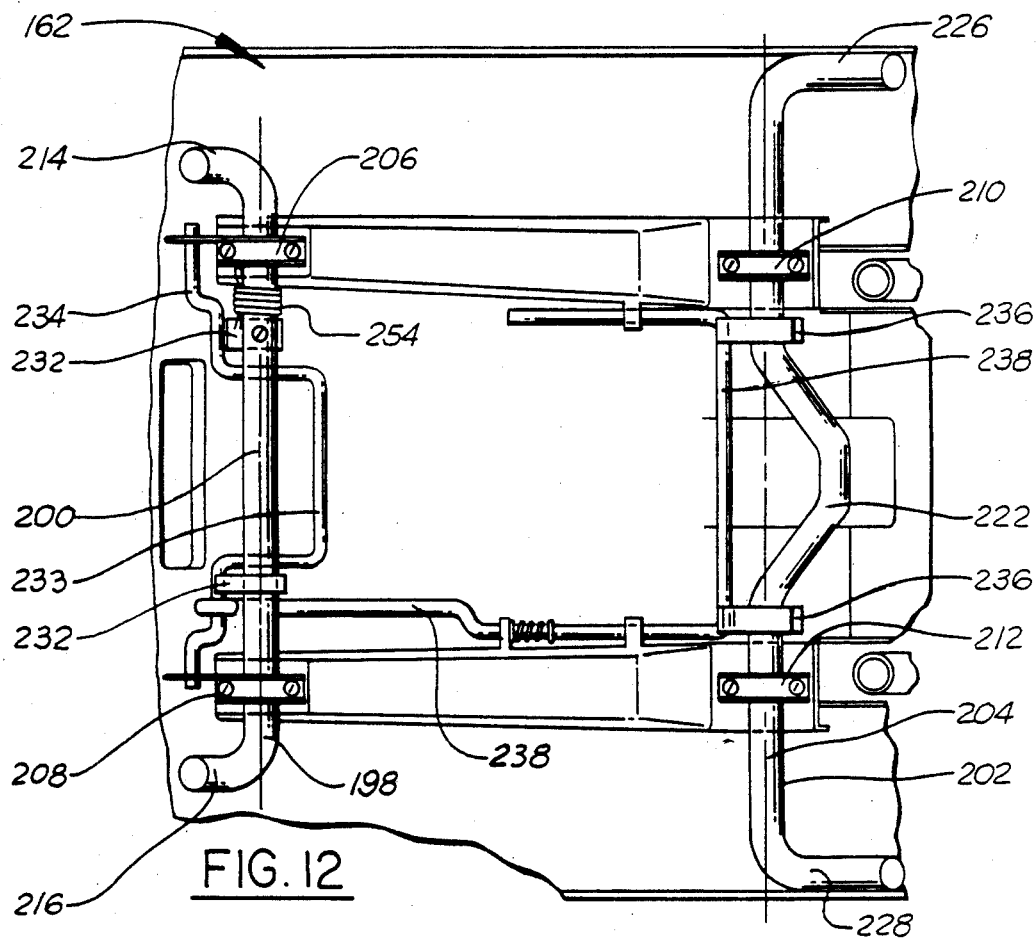
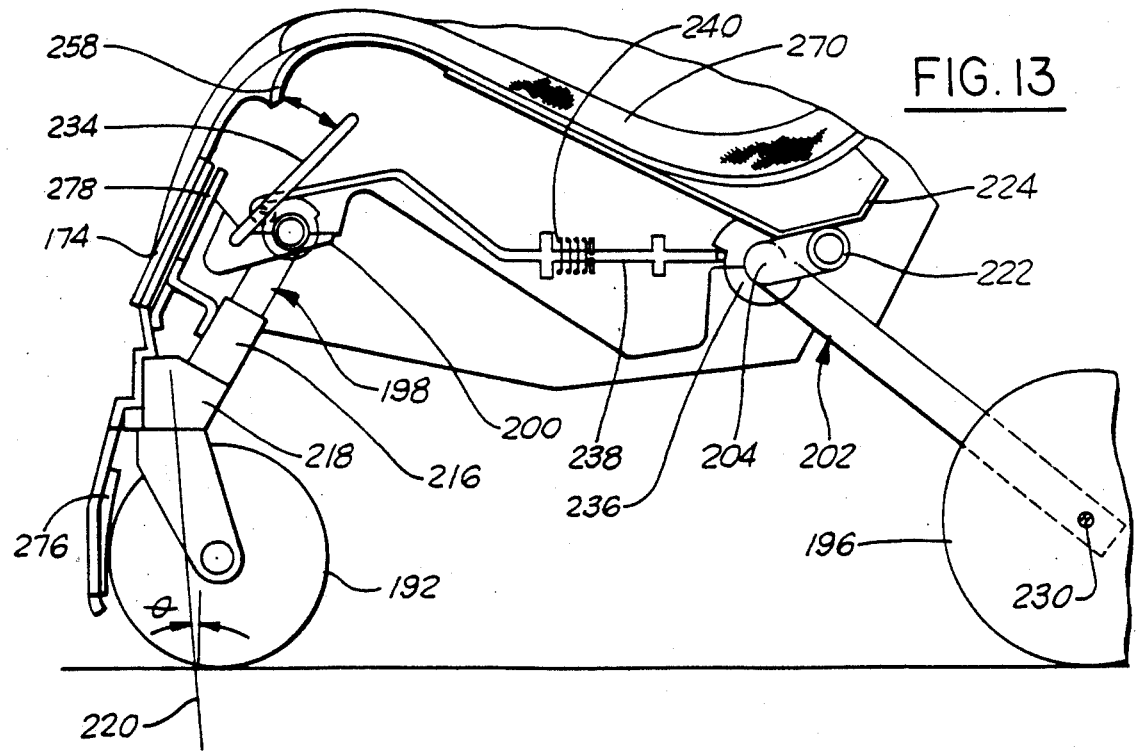

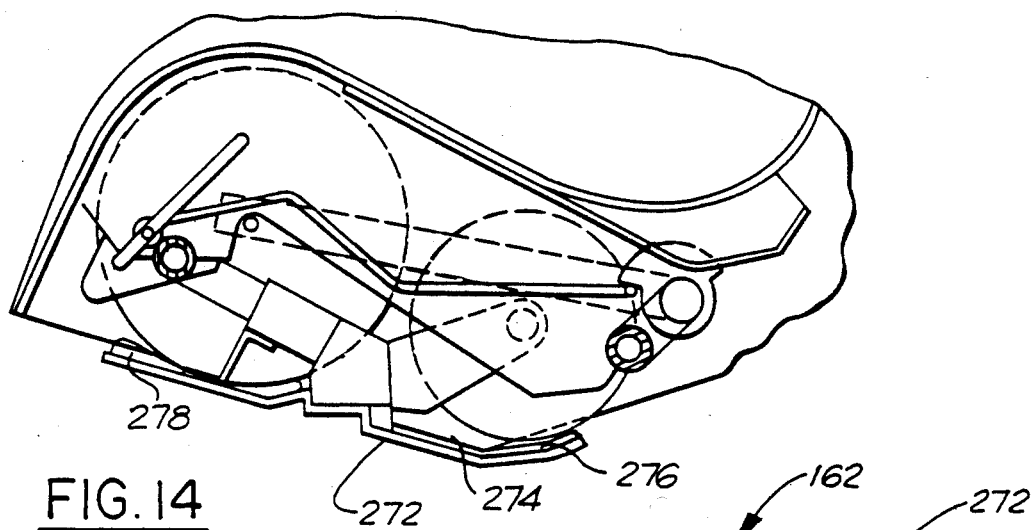
FIG. 14
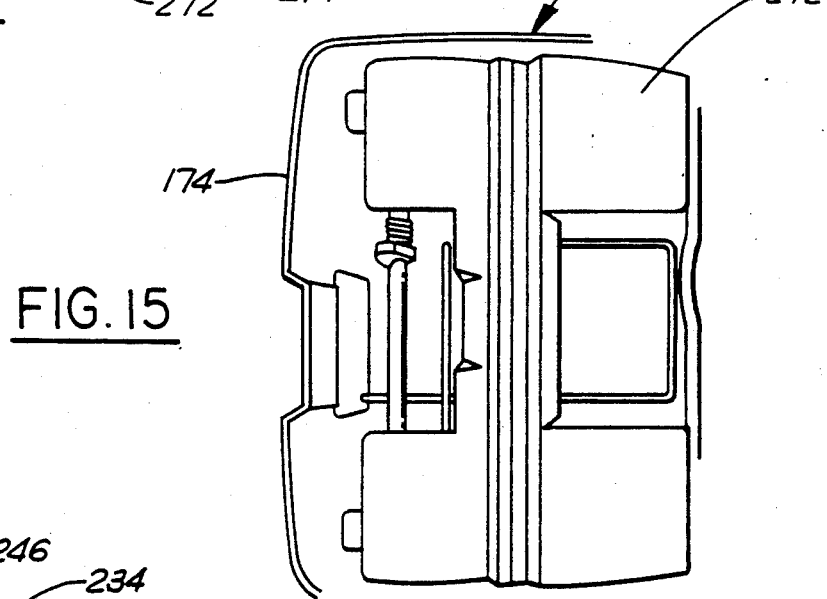
FIG. 15
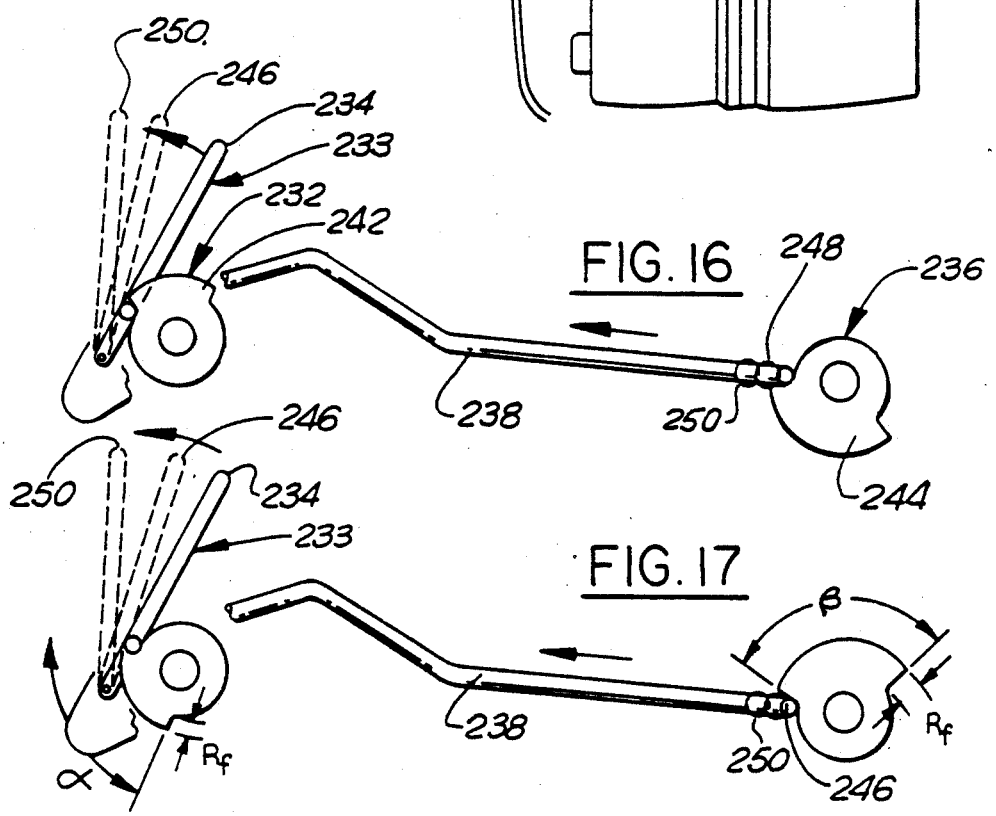
FIG. 16
FIG. 17

4,989,888

COMBINATION CHILD RESTRAINT & STROLLER

RELATED APPLICATIONS

This is a continuation-in-part of co-pending U.S. patent application No. 086,027, entitled Child's Restraint-Stroller Device, filed Aug. 17, 1987 now abandoned.

TECHNICAL FIELD

This invention relates to a child restraint-stroller device which has particular utility in that the device is readily convertible between a passive restraint seat inside a vehicle and a stroller outside the vehicle without the need to remove the child from the device during the conversion process.

BACKGROUND ART

Several types of strollers or baby carriers have been devised which are capable of being converted into car seat units. Such strollers include the three-wheel and four-wheel variety. Representative of convertible strollers is that disclosed in U.S. Pat. No. 4,620,711 to Dick. In Dick, the parts comprising the carrier are convertible between a stroller and a car seat wherein the wheels can be folded upwardly so as not to rest directly on the car seat. Other convertible strollers are disclosed in U.S. Pat. Nos. 2,291,640 and 3,207,528.

The conventional restraint-stroller devices, such as those mentioned above, include numerous component parts which make the process of converting between the restraint and stroller configurations quite cumbersome, with numerous opportunities for the operator or occupant to be pinched or nipped while handling or sitting in the device. Additionally, the conventional devices leave unsolved the problem of catching debris from the wheels so that the vehicle seat which underlies the stroller when used in the restraint mode does not become soiled from falling or dripping debris.

Additionally, the conventional restraint-stroller devices are relatively cumbersome to convert between the restraint and stroller modes, particularly if the infant remains in the device during the conversion process.

DISCLOSURE OF INVENTION

An object of the present invention is to provide an improved multi-function child restraint-stroller device which has particular utility as a passive restraint seat in a vehicle, and as a stroller outside the vehicle.

In carrying out the above object, the restraint-stroller device of the invention includes a horizontally extending seat portion for supporting the child. A plurality of retractable struts is mounted adjacent the seat portion. Each strut has a first end and a second end. The first end is pivotally mounted proximate the seat portion so that each strut is swingingly movable about the first end from an extended position in which the device is used as a stroller to a retracted position below the seat in which the device is used as a passive restraint seat in the vehicle. Each strut has a wheel rotatably mounted to the second end thereof.

A back portion having a lower section is connected to the seat portion so that the child is securely supported in a seated position. The back portion is adapted for restraining horizontal movement of the child when the vehicle is in motion. A handle is mounted on the back portion, the handle telescopically protruding outwardly to an extended position for maneuvering the device when used as a stroller. The handle is contractible inwardly to a shortened position for compact storage when the device is used as a passive restraint seat, the device being convertible from a stroller to a passive restraint seat and vice-versa without removing the child from the device.

A pair of hollow arm rests, each arm rest having an underside, is connected to the seat portion and the back portion. Each arm rest defines a downwardly opening cavity in the underside thereof into which the associated struts and wheels retract when the device acts as a passive restraint seat.

In the preferred embodiment of the multifunction child's restraint-stroller device, a cover is connected to, and extends between, the front struts so that when the front struts are in the extended positions, the cover provides a footrest for the child. When the front struts are in the retracted positions, the cover provides a mudguard to prevent debris from soiling the vehicle.

Associated with the struts are means, connected to each strut, for locking each strut in its extended position, and means, also connected to each strut, for securing each strut in its retracted position within the associated cavity of the arm rest whereby the device is convertible between the seat restraint and the stroller with the child remaining in the device.

The object features and advantages of the present invention are readily apparent from the following detailed description of the best mode for carrying out the invention when taken in connection with the accompanying drawings.

BRIEF DESCRIPTION OF DRAWINGS

FIG. 3 is a right side elevational view of the preferred embodiment shown in FIG. 2 with each wheel in its extended position;

FIG. 4 is a right side elevational view of the preferred embodiment shown in FIG. 1 with each wheel in its retracted position;

FIG. 5 is an enlarged sectional view of one of a pair of retaining means for the handle;

FIG. 6 is a bottom view of the embodiment shown in FIG. 1, with the cover partially sectioned;

FIG. 9 is a side elevation of the apparatus in the stroller mode;

FIG. 10 is a front view of the stroller of FIG. 9;

FIG. 11 is a rear view of the stroller of FIG. 9;

FIG. 12 is a bottom plan view of the strut lock mechanism;

FIG. 13 is a cross-sectional side elevation taken along line 13—13 of FIG. 12 showing the lock mechanism with the wheels in the extended position;

FIG. 14 is a cross-sectional side elevation equivalent to FIG. 13 with the lock mechanism shown with the wheels in the retracted position;

FIG. 15 is a bottom plan view of the FIG. 7 embodiment of the apparatus with the wheels in the retracted position;

FIG. 16 is a partial side elevation showing cam position in the stroller mode; and FIG. 17 is a side elevation showing cam position in the passive restraint mode.

BEST MODE FOR CARRYING OUT INVENTION

Figure 1:
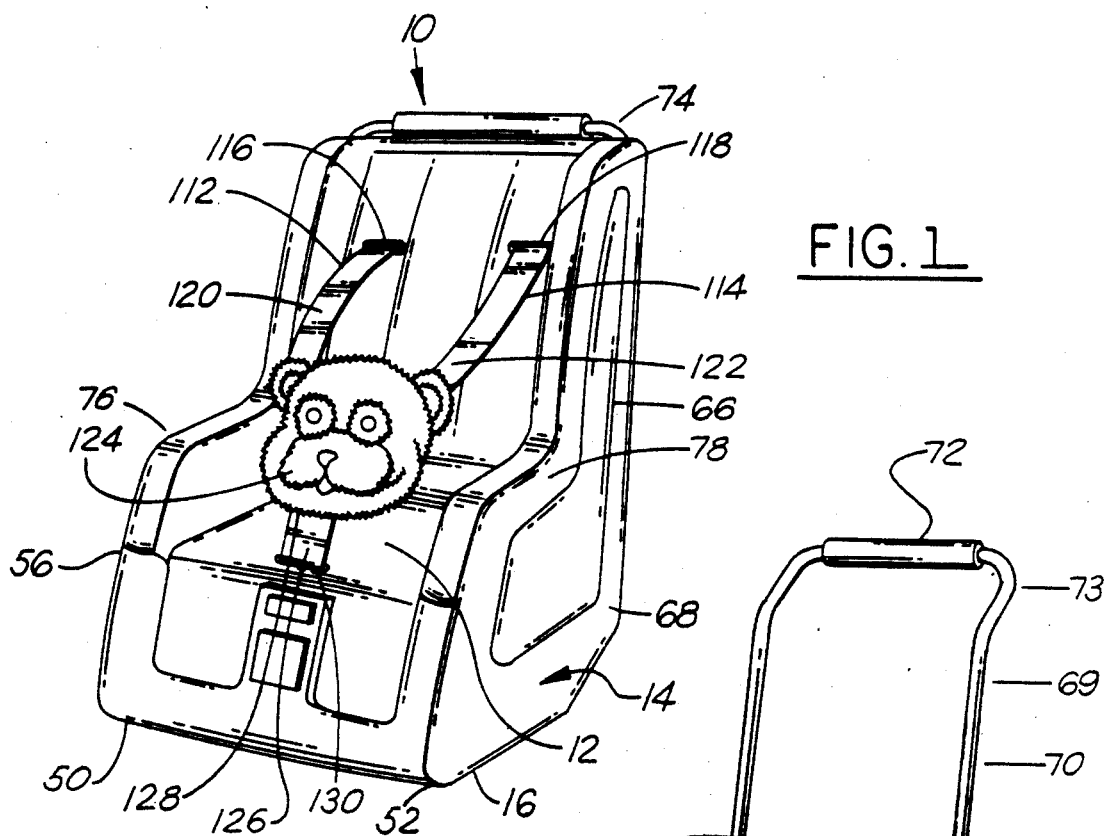
FIG. 1 is a front perspective view illustrating a preferred embodiment of this invention with each wheel in its retracted position.

With reference to the drawings, a multifunction child restraint-stroller device (10) according to the present invention, includes a body (14) having a horizontally extending seat portion (12) for supporting the child. The seat portion (12) has a lower surface (16). A plurality of retractable struts (18, 20, 22, 24) have first ends (26, 28, 30, 32) and second ends (34, 36, 38, 40), with the first ends being pivotally mounted proximate the lower surface (16) of the seat portion (12). Each strut (18, 20, 22, 24) is swingingly movable about the first end from an extended position (42, 44, 46, 48) in which the device is used as a stroller to a retracted position (50, 52, 54, 56) below the seat portion (12), in which the device (10) is used as a passive restraint seat in the vehicle. Rotatably mounted to the second end (34, 36, 38, 40) of each strut (18, 20, 22, 24) is a wheel (58, 60, 62, 64).

As illustrated in FIGS. 1-4, the device (10) also includes a back portion (66) having a lower section (68) connected to the seat portion (12) so that the child is securely supported in a seated position. Accordingly, the back portion restrains horizontal movement of the child when the vehicle is in motion. Mounted upon the back portion (66) is a U-shaped handle (69), the U-shaped handle (69) telescopically protruding outwardly to an extended position (73) for maneuvering the device when used as a stroller. To enable the device to be used as a passive restraint seat, the U-shaped handle (69) is retractable inwardly parallel to the extended position to a retracted position (74) for compact storage. Each of a pair of arm rests (76, 78) is connected to the seat portion (12) and the back portion (66). Below each hollow arm rest (76, 78) is an underside (80, 82) which defines a downwardly opening cavity (84, 86) into which the associated struts (18, 20, 22, 24) and wheels (58, 60, 62, 64) retract when the device (10) acts as a passive restraint seat.

As illustrated in FIGS. 3, 4, and 6, the plurality of retractable struts concludes a front pair of struts (18, 20) having a pair of front connecting bars (88, 89) extending therebetween to enable the front pair of struts to move together between the extended positions (42, 44) and retracted positions (50, 52) and to brace the front pair (18, 20) of struts. Also included in the plurality of retractable struts is a rear pair (22, 24) of rear struts and a pair of rear connecting bars (90, 91) extending therebetween. The rear connecting bars (90, 91) enable the rear pair of struts (22, 24) to move together between the extended (46, 48) and retracted (54, 56) positions and to brace the rear pair of struts.

Figure 2:
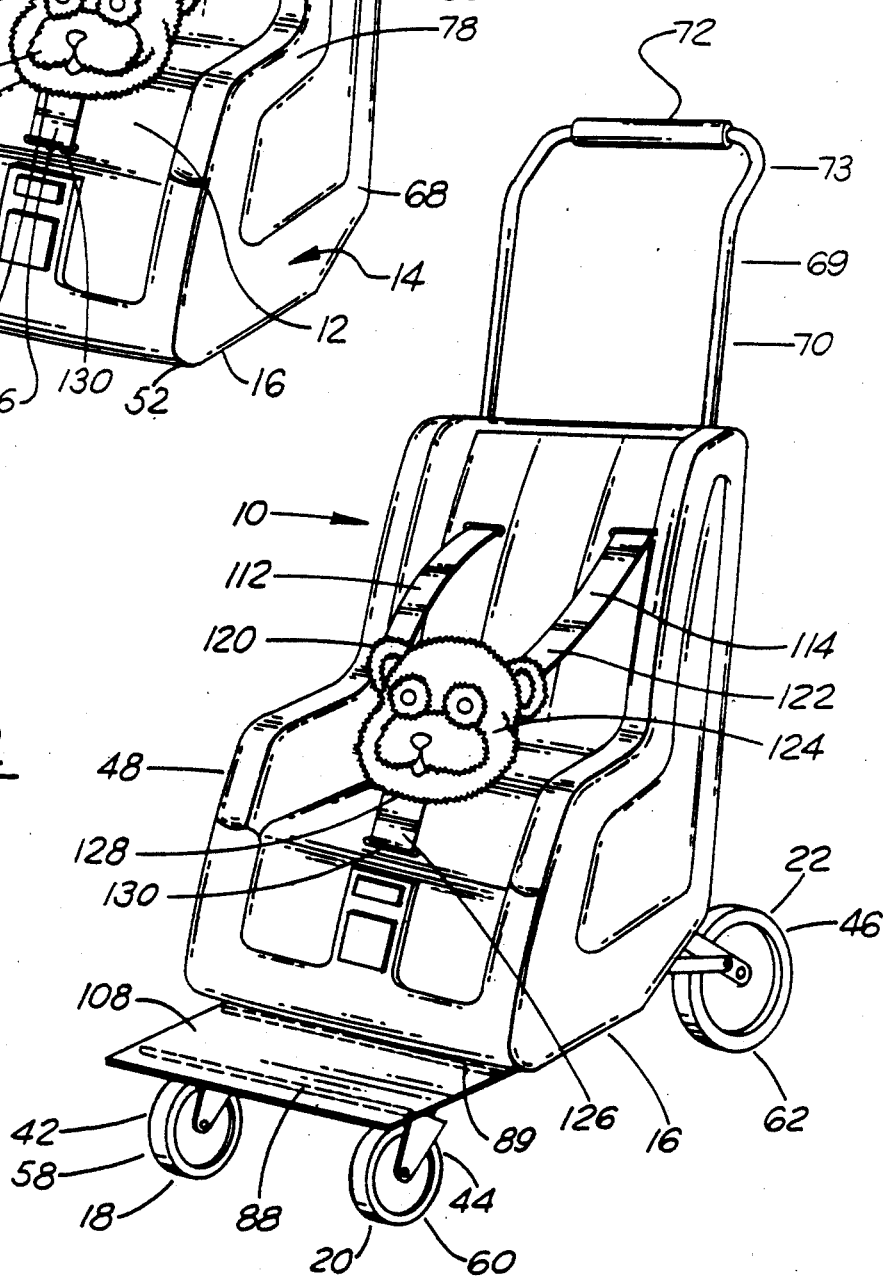
FIG. 2 is a front perspective view of the embodiment shown in FIG. 1 with each wheel in its extended position.

With continuing reference to FIGS. 2-4, the preferred embodiment of the device includes locking means (92, 94, 96, 98), connected to each strut for locking each strut in its extended position (42, 44, 46, 48). Each locking means comprises, for example, a first elongate arm (132) which is pivotally connected to an associated strut (18, 20, 22, 24) and a second elongate arm (134), one end of which is pivotally connected to the associated underside (80, 82) proximate the associated hollow arm rest (76, 78). The distal ends of the first and second arms (132, 134) are themselves pivotally connected. Upon retraction, each arm swings about its pivotally mounted ends so that the associated strut (18, 20, 22, 24) is secured in its extended position when the first and second arms (132, 134) are approximately aligned in an end-to-end configuration. The associated struts (18, 20, 22, 24) are secured in their retracted positions (50, 52, 54, 56) when the first and second arms (132, 134) become oriented so they lie along side each other, as best illustrated in FIGS. 4 and 6. As disclosed, means for securing (100, 102, 104, 106) each strut (18, 20, 22, 24) in its retracted position (50, 52, 54, 56) within the associated downwardly opening cavity (84, 86) of the hollow arm rest (76, 78) permit the device (10) to be convertible between the seat restraint and the stroller without the child needing to be removed from the device (10) during the conversion process. With particular reference to FIG. 6, each securing means includes, for example, a cam (100, 102, 104, 106) defining a detente which engages a stud or cross bar mounted to the underside (80,82) of the device (10).

Alternately, the invention as illustrated in FIG. 3 may have the back portion (66) hingedly connected to the horizontally extending seat portion (12), so that the back portion (66) is movable between a laid back position (148) in which the child is supported in the horizontally extended position to an upright position (150) in which horizontal movement of the child is restrained. It should be noted that the back portion (66) may only recline when the device is in the stroller mode. The back is always securely locked in the upright position when the device is in the passive restraint seat mode. Preferably, however, the body (14) is formed of a single piece in order to minimize the overall weight of the device.

In the preferred embodiment, the device (10) includes a U-shaped handle (69) including first and second uprights bars (70, 71) and a padded, horizontally extending cross bar (72) connecting therebetween. The first and second bars (70, 71) of the U-shaped handle (69) are mounted on the back portion (66) proximate the lower section (68) thereof.

As best illustrated in FIGS. 3-5, the device (10) further includes detent means (110), mounted on the back portion (66) for retaining the U-shaped handle (69) in the extended position (73). Upon activation of the means (110) for retaining the U-shaped handle (69), the U-shaped handle (69) is secured in the extended position (73) for maneuvering the stroller. When the detent means (110) is released, the U-shaped handle (69) is contractible inwardly to a shortened position (74) for deployment of the device as a restraint seat.

As illustrated in FIGS. 1-2, the device (10) further includes a pair of shoulder straps (112, 114), each having a top end (116, 118) fixed to the back portion (66). Each shoulder strap (112, 114) has a bottom end (120, 122). Removably secured to each bottom end (120, 122) of the associated shoulder strap (112, 114) is a detachable cushioned linking member (124). A middle strap (126) has an upper end (128) which is removably attached to the linking member (124) and a lower end (130) which is connected to the horizontally extending seat portion (112) so that the child is firmly yet comfortably retained in the restraint-stroller device (10) when the detachable linking member (124) connects the shoulder straps (112, 114) and the middle strap (126).

The preferred embodiment, as best illustrated in FIGS. 2-4, includes a protective cover (108) which is connected to and extends between the front struts (18, 20) so that when they are in the extended positions (42, 44), the cover (108) provides a footrest for the child. When the front struts (18, 20) are in the retracted positions (50, 52), the cover (108) provides a mudguard to prevent debris from falling off the wheels and thus soiling the vehicle seat.

While numerous materials can be used in the process of making the device (10), it has been found that superior results have been obtained by using a synthetic material such as vinyl or other closed cell materials in fabricating the horizontally extending seat portion (!2), the back portion (66), and the arm rests (76, 78). Thus, the device can readily be wiped clean without debris falling into the interstices of the device.

In use, it has been found that the detachable linking member (124) can acquire desirable aesthetic and functional attributes by being made in the form of an animal toy which is filled with energy-absorbing materials such as a high density foam. The struts and associated wheels are preferably made of a composite, non-corrosive material such as plastic, acrylonitrile butadyne styrene (ABS) or of a high density polyethylene (HDPE) which has been injection molded. Alternatively, the struts can be made of thin wall steel tubing which has been plated for corrosion resistance. The seat (12), arm rests (76, 78), and back portion (66) are filled with a high density foam filler, such as a three-layer laminate.

In operation, the device (10) is convertible from a passive restraint seat to a stroller as follows. First, the linking member (124) is detached and the child is installed. Then, the linking member (124) is connected to the associated straps (112, 114, 126). The device is secured to the vehicle seat by taking the vehicle's seat belt and leading the seat belt across the arm rests (76, 78). After securing the vehicle seat belt, the device can then be used as a passive restraint seat in the vehicle. When it is desired to use the device (10) as a stroller, the vehicle seat belt is unlatched, and the device (10) is rotated by approximately ninety degrees about a vertical axis so that the child then faces the outside of the vehicle. The securing means (100, 102, 104, 106) are then released, together with the detent means (110) for the handle. After lifting the device and its occupant from the seat, the struts and associated wheels then move into their extended positions and the locking means are then engaged. The device is then lowered onto the sidewalk. After the U-shaped handle (69) is moved outwardly to the second position (73), the retaining means (110) are engaged and the device (10) is maneuvered as a stroller by the operator grasping the cross bar (72) of the U-shaped handle (69). In operation, the rear wheels (62, 64) have a slightly larger diameter than the front wheels (58, 60), and improved stability in steering is obtained when the track of the rear wheels (62, 64) exceeds the track of the front wheels (58, 60).

As illustrated in FIG. 5, the retaining means (110) is released from an activated position in which the handle (69) is secured in the extended position (73) by pulling a lever (140) outwardly. The first and second upright bars (70, 71) can then be moved downwardly. The locking pin (142) is pivotally attached to the lever (140), and extends through a helical tension spring (144). Once the locking pin (142) emerges from a locking hole (146), the associated upright bars (70, 71) will easily slide downward and the lever (140) can be released.

Figure 7:
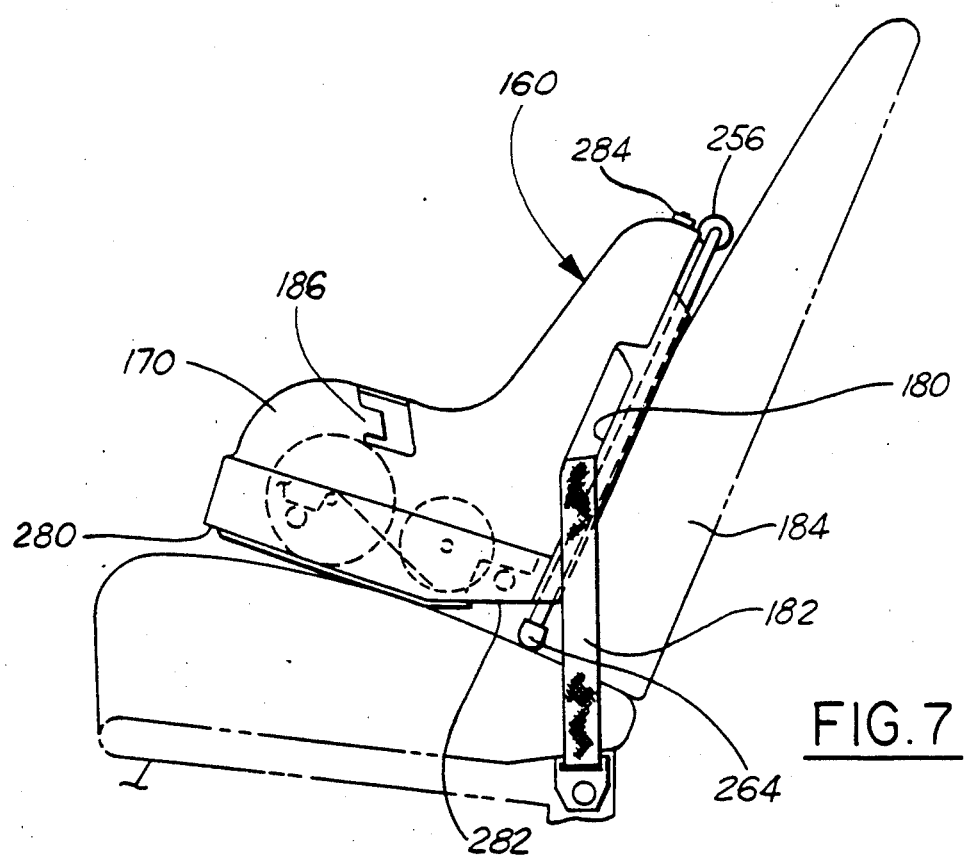
FIG. 7 is a side elevation of an alternative embodiment of the invention, positioned on a vehicle seat in the forward facing position.
Figure 8:
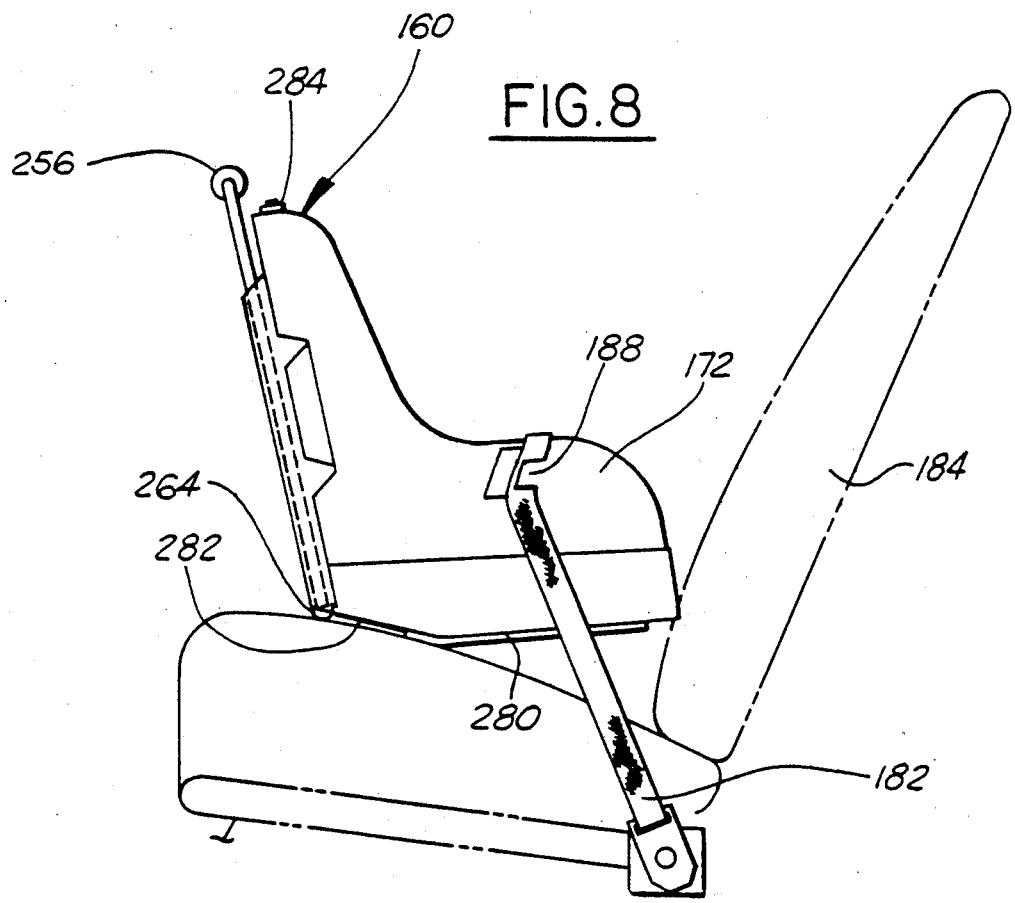
FIG. 8 is a side elevation of the apparatus of FIG. 7 positioned on a vehicle seat in the rearward facing position.

An alternative embodiment of the child restraint-stroller (160) is shown in FIGS. 7-17. The child restraint-stroller apparatus (160) can be used as a passive restraint car seat in the forward facing position, as shown in FIG. 7, or in the rearward facing position, as shown in FIG. 8. When the child restraint-stroller apparatus (160) is removed from the vehicle, it can be readily transformed from the passive restraint mode to the stroller mode, as shown in FIG. 9. The child restraint-stroller apparatus (160) includes a body (162) having a child supporting surface (164) including a seat (166), a back (168), and a pair of arm rests (170, 172). The body is also provided with a wall portion (174) which extends about the front and the tube sides of the body partially enclosing an internal cavity (176) oriented below the seat. Internal cavity (176) is provided with a downwardly facing opening (178). The body is also provided with suitable attachment means for removably attaching a vehicle seat belt to the body. Opening (180) which is formed behind the child support surface receives a vehicle seat belt (182) when the apparatus is affixed to the vehicle seat (184) in a forward facing position, as shown in FIG. 7. In the rearward facing passive restraint position, shown in FIG. 8, seat belt (182) extends over both armrests and is positioned by locator (186, 188) integrally formed in the body, as shown.

The child restraint-stroller apparatus (160) is provided with a pair of front wheels (190, 192) and a pair of rear wheels (194, 196), as shown in FIGS. 9-11. A front strut assembly (198) supports the front wheels which are freely rotatable relative thereto. The front strut assembly (198) is pivotably attached to the body and rotatable between an extended and retracted position. Front strut assembly (198) pivots relative to the body along front strut axis (200), as shown in FIGS. 12-13. Rear wheels (194, 196) are freely rotatably supported by rear strut assembly (202) which is pivotably attached to the body (162) for limited rotation about the rear strut axis (204). The front strut assembly is attached to body (166) by front attachment brackets (206, 208). The rear strut assembly (202) is attached to the body by rear attachment brackets (210, 212). Both the front and rear strut assemblies (198, 202) are generally U-shaped having a central portion affixed to the apparatus body (162). The front strut assembly includes left and right front struts (214, 216) which have front wheels (190, 192) attached to the ends thereto. The front wheels are attached to each strut by caster assemblies (218) which allow the wheel to rotate about a horizontal wheel axis, as well as a generally vertical caster axis (220). Preferably, caster axis is inclined from vertical, as indicated by angle (theta) to cause the wheels to self center.

The rear strut assembly (202) is also generally U-shaped having the center portion thereof pivotably attached to body (162) and rotatable about an axis (204). Preferably, the rear strut assembly is provided with a stop portion (222) extending out of the axis (204), as shown in FIGS. 12-13. Stop portion (222) engages a boss (224) formed in the body to limit the extent of the travel of the strut assembly. The rear strut assembly (202) includes left and right struts (226, 228) to which the wheels are pivotably attached. In the preferred embodiment, rear axle (230) extends between the ends of rear struts (226, 228) to provide additional stability.

The locking system alternatively locks the front rear struts in either the retracted position or the extended position. In the retracted position, shown in FIGS. 7-8, the struts and the wheels are effectively entirely enclosed within the body internal cavity (178) when the apparatus is in cooperation with the vehicle seat. In the wheel and strut extended position, shown in FIGS. 9-13 and 16, the body is supported above the ground on the wheels and the struts for use as a stroller. The front strut assembly is locked alternatively in the extended or retracted position by front cam (232) mounted on the front strut assembly's (198) central section at front locking bar (234). Rear strut (202) is held alternatively in the extended or retracted position by rear cam (236) and rear lock bar (238).

As shown in FIG. 12, two cams can be provided on each of the front and rear strut assemblies for strength purposes, however, a single cam can be made to work satisfactorily as well. The front and rear lock bars (234, 238) are pivotably connected to one another, and move in unison. Spring (240) cooperates with the rear lock bar and the body to bias the lock bar rearwardly. In order to retract or deploy the wheels, the front lock bar is rotated forwardly. Front lock bar is pivotably attached at each end to front attachment brackets (206, 208) and are pivotable by a generally horizontal lock bar axis. Radially spaced from the front lock bar axis is a region of the front lock bar which serves as a latch member which engages the front cam (232), as shown. The lock bar additionally has a generally U-shaped strut release lever (233) portion centrally located therein radially spaced from the lock bar axis. The release lever is shiftable between a locked and an unlocked position by the user of the device. As the front lock bar rotates about the front lock bar axis, the rear lock bar translates substantially linearly.

The front and rear cams (232, 236) each have a lobe (242, 244). Each lobe has a radial height $R_f$ and $R_r$, and a dwell angle $\alpha$ and $\beta$, as shown in FIGS. 16-17. The dwell angles are selected to correspond to the rotation of the front and rear struts between the fully extended and the fully retracted positions. It should be noted that in the preferred embodiment shown in the drawings, cam lobe heights are carefully selected relative to one another and the locking bar geometry in order to unlock and lock the front and rear struts at different times. With the lock bar in the position shown in FIGS. 16-17 in solid line, the front and rear struts are locked in either the extended or the retracted position respectively. When the front lock bar is rotated to the partially unlocked position (246), the front lock bar will move sufficiently relative to the front cam lobe to unlock the front strut due to the relative rear cam lobe height and the rear lock bar geometry. The rear lock bar in the partially position (248) will continue to engage the rear cam lobe. Continued movement of the front lock bar to the fully unlocked position (250) as shown in dotted line, moves the rear lock bar sufficiently to position (252) to release the rear cam lobe (244).

Preferably, the front strut assembly is elastically biased to the extended position by strut spring (254). In the preferred embodiment shown, no strut spring is provided on the rear strut assembly.

In operation, when it is desired to convert the child restraint-stroller apparatus from a passive restraint car seat to a stroller, the transition can be made simply and easily without necessitating removing the child from the apparatus. With the car seat in either of the alternative positions shown in FIGS. 7-8 with the child seated therein, the first step in the stroller conversion process is to detach the vehicle seat belt (182). The user then grasps the car seat at opposite ends of the child supporting surface. In the preferred embodiment, the handle (256) provides a convenient rear grip and front grip (258) provides a convenient front grip. The child restraint-stroller apparatus can then be lifted out of the vehicle by the user with two hands. While holding the apparatus above the ground, the user moves the front lock bar (234) which is mounted adjacent the front grip (258). As the front lock bar moves to the partially unlocked position (246), the front strut and wheels are moved to the fully extended position by a combination of gravitational force and the force of strut spring (254). Continued lock bar movement to the fully unlocked position (250) results in the sequential unlocking of the rear strut assembly. The rear strut is not spring loaded, and will fall as a result of gravity.

Once the rear strut is unlocked, the user may release the front lock bar handle portion. The rear strut will unlock until moved to the fully extended position, and rear lock bar will ride on the cam lobe allowing the strut to freely pivot until it becomes fully extended, at which time the rear lock bar will latch into place as a result of lock bar spring (240). The rear strut will typically lock in place as soon as the apparatus is placed on the ground.

Once the child restraint-stroller apparatus is placed on the ground with the wheels and struts fully extended, handle (256) is raised to the upright position, as shown in FIG. 11. Detent (260) cooperates with the body and the handle to allow the handle to be telescopically locked in a number of alternative positions extending between the fully raised position, shown in FIG. 11 in dotted line, and the fully lowered position, shown in solid line. Handle (256) is an elongated member having an upper first end (262) adapted to be held by an user to push the apparatus in the stroller mode. The handle is also provided with a second end (264) adapted to cooperate with the vehicle seat to stabilize the apparatus is the passive restraint mode, as shown in FIGS. 7 and 8.

The handle central region (266) generally extends between the handle first and second ends (262, 264) while telescopically cooperating with the body (162) and detent (260). Detent (260) is constructed of a pair of elastically, outwardly biasable pins which engage corresponding holes spaced along the handle center portion (266). As shown in FIG. 10, the apparatus is provided with a five point belt system (268) which provides restraint means for temporarily restraining the child within the apparatus. The belt system could alternatively be a three point belt system, both of which are known and utilized in the industry. The child supporting surface (164) is preferably covered with a soft cushion (270), shown in FIGS. 10 and 13 which is a conventional design. Preferably, cushion (270) is removable for cleaning purposes.

When the restraint-stroller apparatus is in the stroller mode, protective cover (272) extends downwardly from the front section of wall portion (174) extending in front of the front wheels to prevent the child from contacting the front wheels with his/her feet. The protective cover (272) is attached to the front strut assembly. As shown in FIG. 13, the protective cover engages the interior portion of wall member (174) to provide a forward stop for the front strut rotation. In the passive restraint mode, when the wheel and struts are retracted, protective cover (272) serves to at least partially cover the undersigned of the body internal cavity and to cooperate with the vehicle seat. Preferably, the protective cover sufficiently covers the four wheels in the retracted mode to prevent the wheels from engaging with the vehicle seat. When in the retracted mode, protective cover (274) engages center seat boss (224) which serves to transmit the load exerted on the protective cover to the body of the apparatus.

In the preferred embodiment shown, absorbitive pads (276, 278) provide a means to catch temporarily retained matter falling from the wheels. The pads are preferably formed of open cell foam or a fibrous mat to absorb water or the like which may fall from the wheels due to melting snow after the wheels and struts are retracted. The absorbitive pads minimize the likelihood of soiling the vehicle seat. Ideally, the water temporarily absorbed by the pads will evaporate, leaving behind residue or other debris which will be dislodged the next time the wheels and struts are extended when the apparatus is safely outside the vehicle. Absorbitive pads (276, 278) are replaceable. A bottom plan view of the apparatus in the wheel retracted position is shown in FIG. 15, illustrating how the protective cover (274) partially covers the underside of the body internal cavity.

As shown in the various side elevations, the body wall portion is provided with a horizontal lower edge (280) generally underlying the seat, and an inclined surface (282) extending upwardly from lower edge (280) beneath the seat back. Handle (256) is telescopically adjustable relative to the body (162) to cause the handle second ends (264) to project downwardly from the rearward portion of inclined surface (282) when the handle is fully retracted. When the seat is in the forward facing upright position shown in FIG. 7, horizontal edge (280), handle second ends (264), and the protective cover engage the vehicle seat. When in the reclined rearward facing position, handle (256) is partially raised enabling the inclined surface (282), handle second ends (264) and the protective cover to engage the vehicle seat, as shown in FIG. 8.

As shown in FIGS. 9-11, the child restraint-stroller apparatus may be provided with an integral electronic sound system providing a means for electronically playing prerecorded music. The sound system in the preferred embodiment is a cassette player (284) having a pair small speakers (286, 288) oriented in the seating surface back (168) adjacent the child's head. The cassette player is preferably mounted to the body immediately above and behind the child's head position so as to prevent the child from tampering with the cassette player controls. It should be appreciated that the cassette player described is only one possible means for electronically playing prerecorded music, and it should be readily appreciated that a compact disk player or other device could perform a similar function. With the speakers located so closely to the child's head, it will not be necessary to play prerecorded music so loudly so as to disturb other occupants of the vehicle. The cassette player is provided with batteries to power the device in both the stroller and passive restraint modes. It should be understood that a single speaker will perform satisfactorily. The integral sound system may be used in conjunction with a variety of child restraint devices, including car seats and strollers which are not designed for dual purpose use.

While the best mode for carrying out the invention has been described in detail, those familiar with the art to which this invention relates will recognize alternative ways of practicing the invention as defined by the following claims.

We claim:

1. A combination child restraint/stroller apparatus for use as a passive restraint in cooperation with a vehicle seat and seat belt, and as a stroller outside the vehicle, said apparatus comprising:
    a body having a child supporting surface including a seat, a back and a pair of armrests, a wall portion defining a partially enclosed internal cavity below the seat having a downwardly facing opening therein, and attachment means for removably attaching the vehicle seat belt to the body;
    a pair of front and a pair of rear wheels;
    at least one front and one rear strut freely rotatably supporting the front and rear wheels, said struts pivotably attached to the body; and
    lock means for locking the front and rear struts in either a retracted position in which the wheels and struts are enclosed within the body internal cavity when the apparatus is in cooperation with a vehicle seat, or an extended position in which the body is supported upon the wheels, said lock means being shiftable between a locked position where both struts are locked, a partially unlocked position where only one strut is unlocked, and a fully unlocked position in which both struts are unlocked.

2. The apparatus of claim 1, further comprising:
    a handle cooperating with the body and shiftable between an extended and retracted position; and
    restraint means for temporarily restraining a child, said restraint means cooperating with the body and the child to maintain the child seated.

3. The invention of claim 1, further comprising a spring cooperating with the front strut and the body to bias the strut to the extended position.

4. The invention of claim 1, further comprising a protective cover attached to the front strut extending in front of the front wheels when in the extended position, preventing the child from contacting the front wheels.

5. The invention of claim 4, wherein said protective cover at least partially covers the underside of the body internal cavity, and cooperates with the vehicle seat when the wheels are in the retracted position.

6. The invention of claim 2, wherein the body wall portion is provided with a horizontal lower edge generally underlying the seat, and an inclined surface extending upwardly from the lower edge beneath the seat back wherein the apparatus may be positioned upon the vehicle seat in a forward facing upright position, or alternatively, in a reclined rearward facing position with the inclined surface engaging the vehicle seat.

7. The invention of claim 6, further comprising detent means for releasably affixing the handle to the body in the extended, retracted, and the various intermediate positions therebetween.

8. The invention of claim 1 further comprising electronic means for playing prerecorded music, said electronic means integrally mounted to the body and including a speaker affixed to the body.

9. A combination child restraint/stroller apparatus for use as a passive restraint in cooperation with a vehicle seat and seat belt, and as a stroller outside the vehicle, said apparatus comprising:
    a body having a child supporting surface including a seat, a front grip for cooperation with one hand of the user while lifting the apparatus, a back and a pair of armrests, a wall portion defining a partially enclosed internal cavity below the seat having a downwardly facing opening therein, and attachment means for removably attaching the vehicle seat belt to the body;

a handle attached to the body for cooperation with one hand of the user while lifting the apparatus;

a pair of front and a pair of rear wheels;

a front and rear strut each being generally U-shaped and provided with a central section pivotably attached to the body and having right and left strut portions extending therefrom for pivotably supporting the front and rear wheels, said front and rear strut central sections each pivotably cooperating with the body for rotation about a front and rear strut axis;

a front and rear locking cam affixed to the front and rear strut central sections respectively and front and rear latch members for cooperating with the front and rear locking cams to lock the front and rear struts in either a retracted position in which the wheels and struts are enclosed within the body internal cavity when the apparatus is in cooperation with the vehicle seat, or an extended position in which, the struts are extended so the body can be supported upon the wheels, and a central release mechanism cooperating with said front and rear latch members and oriented adjacent the front grip so as to be operable by the user to unlock both the front and rear struts while the apparatus with a child seated therein is lifted by the user.

10. The invention of claim 9, wherein said front and rear locking cams are provided with lobes which have a dwell corresponding to the angular rotation of the front and rear struts between the extended and retracted position.

11. The invention of claim 10, wherein said front and rear cam lobes have relative heights selected to allow the front strut to be released when the release mechanism is moved to a partially unlocked position, and both front and rear struts to be released when the release mechanism is moved to a full unlocked position.

12. A combination child restraint/stroller apparatus for use as a passive restraint in cooperation with a vehicle seat and seat belt, and as a stroller outside the vehicle, said apparatus comprising:

a body having a child supporting surface including a seat, a back and a pair of arm rests, a wall portion defining a partially enclosed internal cavity below the seat having a downwardly facing opening therein and provided with a horizontal lower edge generally underlying the seat and an inclined surface extending upwardly from the lower edge beneath the seat back, enabling the apparatus to be positioned upon vehicle seat in the forward facing upright position or alternatively, in a reclined rearward facing position with the inclined surface engaging the vehicle seat, said body further provided with an attachment means for removably attaching the vehicle seat belt thereto;

a handle telescopically cooperating with the body and shiftable between an extended and retracted position, said handle comprising an elongated member with a first and second end and central region therebetween, said first end adapted to cooperate with a user to push the apparatus when used as a stroller and said second end projecting downwardly from the body adjacent the lower edge inclined surface to cooperate with the vehicle seat to stabilize the apparatus when used as a passive restraint in either the forward facing or rearward facing positions;

detent means for releasably affixing the handle to the body in various telescopic positions;

a pair of front and a pair of rear wheels;

at least one front and one rear strut freely rotatably supporting the front and rear wheels, said struts pivotably attached to the body; and lock means for locking the front and rear struts in either a retracted position in which the wheels and struts are enclosed within the body internal cavity when the apparatus is in cooperation with a vehicle seat, or an extended position in which the body is supported upon the wheels.

13. A combination child restraint/stroller apparatus for use as a passive restraint in cooperation with a vehicle seat and seat belt, and as a stroller outside the vehicle, said apparatus comprising:

a body having a child supporting surface including a seat, a back and a pair of armrests, a wall portion defining a partially enclosed internal cavity below the seat having a downwardly facing opening therein, and attachment means for removably attaching the seat belt to the body;

a pair of front and a pair of rear wheels;

at least one front and one rear strut freely rotatably supporting the front and rear wheels, said struts pivotably attached to the body;

a handle cooperating with the body and shiftable between an extended and retracted position;

restraint means for temporarily restraining a child, said restraint means cooperating with the body and the child to maintain the child seated;

a protective cover attached to the front strut extending in front of the front wheels when in the extended position, preventing the child from contacting the wheels, and partially covering the underside of the body internal cavity to prevent the wheels from contacting the vehicle seat when in the retracted position; and lock means for locking the front and rear struts in either a retracted position in which the wheels and struts are enclosed within the body internal cavity when the apparatus is in cooperation with a vehicle seat, or an extended position in which the body is supported upon the wheels, said lock means including a central release mechanism for unlocking both the front and rear struts while the apparatus with a child seated therein is held by a user, said central release mechanism shiftable between the normally locked position to a partially unlocked position, wherein the front strut is released, and to a fully unlocked position wherein both struts are released.

* * * * *